United States Patent [19]

Galuszka et al.

[11] Patent Number: 5,519,693
[45] Date of Patent: May 21, 1996

[54] HIGH SPEED TRANSMISSION LINE INTERFACE

[75] Inventors: Robert J. Galuszka; Andrew J. Walton, both of Reading; Stewart F. Bryant, Redhill, all of United Kingdom

[73] Assignee: Digital Equipment Corporation, Maynard, Mass.

[21] Appl. No.: 167,378

[22] Filed: Dec. 15, 1993

Related U.S. Application Data

[63] Continuation of Ser. No. 722,684, Jun. 28, 1991, Pat. No. 5,301,186.

[51] Int. Cl.⁶ .................................. H04B 1/58; H04L 5/14
[52] U.S. Cl. ..................... 370/24; 370/85.1; 395/182.09; 375/220
[58] Field of Search .................... 370/24, 32, 58.1, 370/58.2, 58.3, 60, 62, 67, 85.1, 85.2, 85.9, 85.11, 94.1, 100.1, 110.1; 371/37.1, 37.2, 37.7, 47.1, 48; 340/825.06, 825,16, 825.17; 375/219, 220; 395/180, 181, 182.01, 182.08, 182.09

[56] References Cited

U.S. PATENT DOCUMENTS

| | | | |
|---|---|---|---|
| 4,225,919 | 9/1980 | Kyu et al. | 370/85.1 |
| 4,509,167 | 4/1985 | Bantel et al. | 370/62 |
| 4,637,012 | 1/1987 | Crabbe, Jr. | 370/24 |
| 4,701,845 | 10/1987 | Andreasen et al. | 364/200 |
| 4,737,950 | 4/1988 | Fechalos | 370/85.1 |
| 4,744,078 | 5/1988 | Kowalczyk | 370/85.9 |
| 4,748,618 | 5/1988 | Brown et al. | 370/94.1 |
| 4,750,171 | 6/1988 | Kedar et al. | 370/85 |
| 4,809,269 | 2/1989 | Gulick | 370/85.2 |
| 4,852,088 | 7/1989 | Gulick et al. | 370/94 |
| 4,949,333 | 8/1990 | Gulick et al. | 370/32 |
| 5,007,051 | 4/1991 | Dalkas et al. | 370/85.1 |
| 5,016,248 | 5/1991 | Kudoh | 370/94.1 |
| 5,058,110 | 10/1991 | Beach et al. | 370/85.1 |

*Primary Examiner*—Alpus H. Hsu
*Attorney, Agent, or Firm*—Kenyon & Kenyon

[57] ABSTRACT

A high performance data link interface includes receive and transmit data framing paths. The data link interface interlocks certain communication link control signals, such as the CCITT standard data set signals, with data being received or transmitted through the interface to correlate a transmission error directly to a particular data transmission for rapid and efficient error recovery.

16 Claims, 2 Drawing Sheets

HIGH SPEED TRANSMISSION LINE INTERFACE

This application is a continuation of U.S. Ser. No. 07/722,684, filed on Jun. 28, 1991, now U.S. Pat. No. 5,301,186, issued on Apr. 5, 1994.

FIELD OF THE INVENTION

The present invention is directed to data communications in a computer network and, more particularly, to a high performance data link interface.

BACKGROUND OF THE INVENTION

The capability of computers to communicate with one another has become a basic attribute of modern information processing. To that end, computers and other processing and operating devices are often coupled to one another in a network so that messages, typically in the form of data packets, can be transmitted between computers of the network. Data transmission services are utilized for the physical transmission of data between nodes of the network, i.e. between points of the network where computers or other devices or systems are physically and electrically coupled to the network.

Network protocols have been developed to control the transmission of data between the nodes of a computer network. Each protocol is typically defined in terms of a number of layers, with each layer relating to a certain aspect of the functionality required for data transmissions throughout a network. For example, the first three layers are defined as a physical layer, a data link layer and a network layer.

The physical layer is directed to the physical and electrical specifications of a physical link, such as the data transmission service or bus that couples the nodes of a network to one another. The physical layer controls bit transmission through the link so that a series of bits of a data packet can be communicated from one node to another node on the network. The physical layer sets the voltage levels for logical ones and zeros, the timing of stable bit information on the link and so on, as necessary to transmit the bits of a data packet over the physical link.

The data link layer is directed to packaging or framing of bits of a data transmission into a defined framed packet that is free of transmission errors. The data link layer creates and recognizes boundaries between bits to define bit fields. The boundaries provide structure and meaning to the bits of a data transmission. For example, the data transmission, when framed according to a data link protocol, can include a start frame byte to indicate the beginning of a framed data packet, a header comprising n bits to indicate source and destination information, the length of the data packet in bytes, the network layer protocol being used and so on. The header can be followed by framed bytes of the actual data packet being communicated from a source device to a destination device, an end byte to indicate the end of the particular data transmission frame and CRC code bytes for use in checking the integrity of a data transmission.

The network layer is directed to the control of routing information required to direct a message from the source device to the destination device on the network. The network layer information is included in one of the bit fields of a frame defined by the data link layer, as e.g., in the header. Each protocol will define the length and content of the network layer information to uniquely identify each source and destination of data in the network and also the processing scheme for routing data frames through the network.

As should be understood, a data link interface is required at each node of the network to receive and transmit serial bits from and to the respective data transmission service and to frame the serial bits for processing at the node. The data link interface will support the electrical and physical specification of the data transmission service coupled to the node and process serial bits received at the node to frame the constituent bytes of a data transmission according to the data link protocol utilized in the network. The data link interface can then transmit the framed data transmission to, e.g., a data link and network layer processor at the node for processing of the frame according to the content of the frame and the protocol utilized in the network.

SUMMARY OF THE INVENTION

The present invention provides a new and improved data link interface for coupling a node of a computer network to a high speed, synchronous data transmission service such as a T1 line. The architecture for the data link interface includes separate receive and transmit data framing paths to fully utilize the separate receive and transmit data paths implemented in full duplex communication links such as T1 lines. The use of separate receive and transmit framing paths permits logical parallel receive and transmit data framing for efficient data link processing of data transmissions received at or transmitted from the respective node of the computer network. A dual port RAM is coupled between the receive and transmit data framing paths for transfer of messages between the data paths. The messages can include, e.g., acknowledgement messages for transmission by the transmit data path in respect of data received at the receive data path and acknowledgement messages received by the receive data path in respect of data being transmitted by the transmit data path. Accordingly, each of the receive and transmit framing paths can operate to perform the respective receive and transmit functions required by the protocol and also communicate with the opposite transmitting or receiving node of the computer network via the communication facility provided by the dual port RAM for full implementation of the data link layer of the protocol used in the network.

Moreover, certain standard signals, such as, e.g., the CCITT standard data set signals, used to indicate a proper communication channel over the data transmission service are coupled directly to each of the receive and transmit framing components of the interface. In this manner, an interlock between the CCITT data set signals and the framing of each particular frame is provided so that the detection of transmission errors (i.e. the negation of CCITT signals) can be directly correlated to a particular frame to facilitate a rapid and efficient transmission error recovery.

In addition, the framing components can be controlled to delay responding to the detection of a transmission error for a predetermined period of time to prevent an error recovery operation when the negation of the CCITT signals is only a glitch and does not indicate a disconnection on the link. The predetermined delay will "smooth" the operation of the data link interface so that an error recovery operation is performed only when there is a true error on the line, as will be explained in more detail below.

Additional standard signals, such as, e.g., the CCITT standard line count signals, are coupled through the line interface to a processor at the respective node. In this manner, the processor receives line speed information for use in scheduling events and the performance of operations required in the processing of data transmissions. Data transmission services such as T1 lines can be operated at any one of a plurality of line speeds within a predetermined range of line speeds. By coupling the CCITT line count signals directly to the processor via the line interface, the processor can configure itself for operation at the particular line speed being utilized in a particular data transmission.

In accordance with another feature of the present invention, each of the receive and transmit framing paths is provided with a FIFO buffer to buffer receive and transmit data between the line interface and a processor or processors at the respective node of the computer system. Moreover, the transmit FIFO buffer can be operated to release data bytes of a frame to the framing component of the transmit framing path for transmission on the link only after a predetermined number of bytes are stored in the FIFO buffer.

Modern high speed data transmission services can operate at line speeds fast enough to transmit bits as fast as a high performance processor at the respective node can load bytes into the transmit FIFO buffer. Typically, a processor performing data link processing for a data transmission will require more time to process a certain number of bytes at the beginning of a frame, as e.g., the header, than the remaining bytes of the transmission. The predetermined number of bytes required before the transmit FIFO buffer releases data for transmission permits a synchronization of the loading of data into the transmit FIFO buffer by the processor with the transmission of bits onto the transmit path of the link. The predetermined number of bytes can be set, e.g., so that at least the header of a data frame is loaded into the transmit FIFO buffer before release of data from the buffer for transmission. Thereafter, the high performance processor will be able to load the transmit FIFO buffer at a speed commensurate with the line speed of the link.

The above described features of the line interface of the present invention, as well as other features of the present invention, provide an efficient and high speed line interface between a node and a data transmission service. The line interface takes full advantage of the separate receive and transmit data paths provided in transmission services such as T1 lines and also implements an advantageous use of standard control signals such as CCITT data set and line count signals for efficient transmission error recovery and flexible configurability of the node for operation at any number of line speeds.

DETAILED DESCRIPTION

Figure 1:
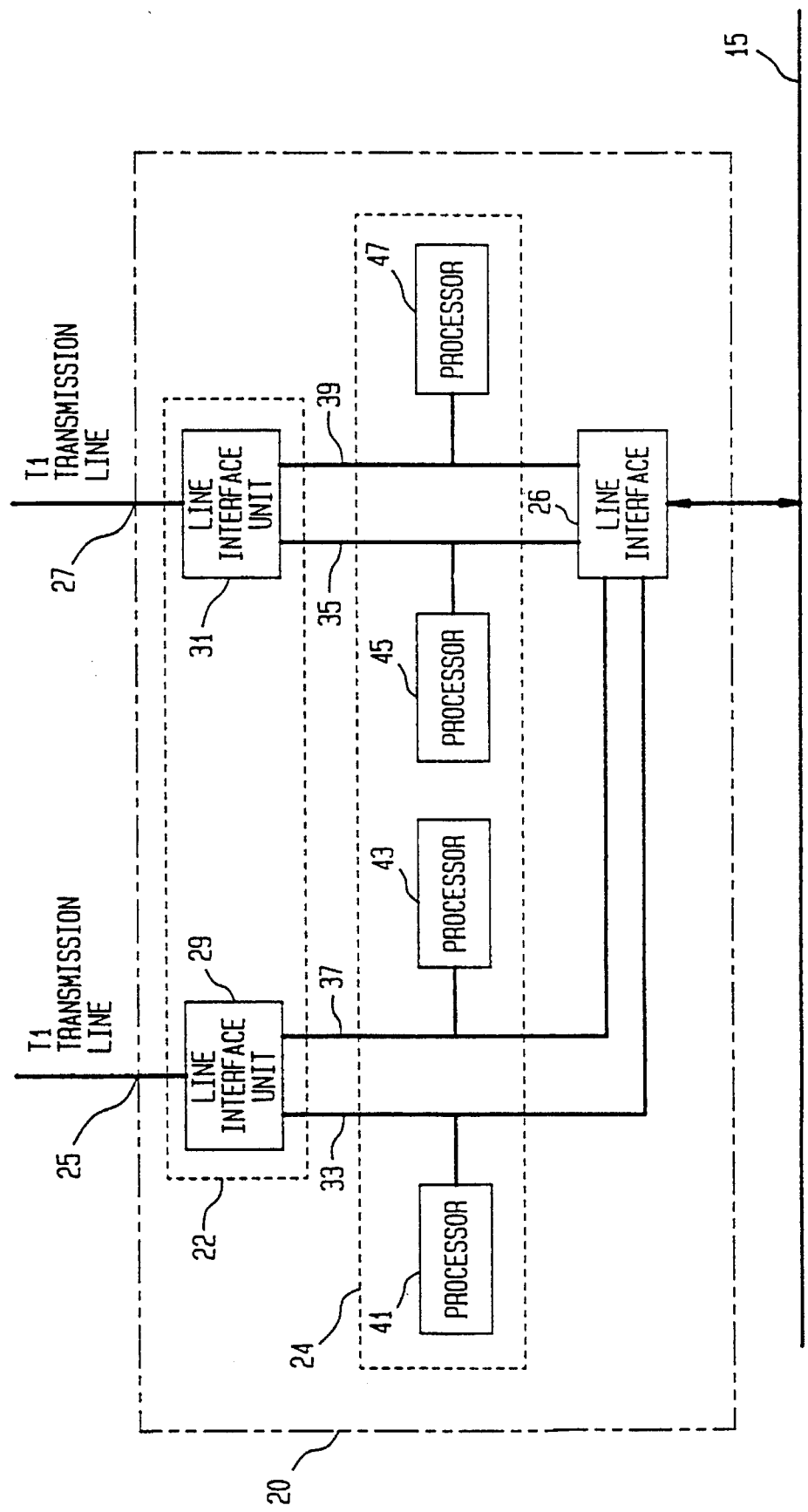
FIG. 1 is a block diagram of a high speed synchronous transmission line interface card according to the present invention.

Referring now to the drawings and initially to FIG. 1, there is illustrated a high speed serial interface card 20 used for coupling a node or other component of a computer network to, for example, T1 transmission lines. The line interface card 20 includes two ports 25, 27. Each port 25, 27 is adapted to be coupled to a synchronous line operating at a line speed of e.g., from 56K bps to 2.048M bps and is user configured to support the electrical and physical specifications of one of the standard line interfaces, such as one of the RS422/449, V.35 and X.21 standard leased telephone lines.

Each of the ports 25, 27 is coupled to a line interface 22 that is, in turn, coupled to a processor 24. The processor 24 is coupled to a bus interface 26 so that the processor 24 can transmit and receive data packets to and from a bus 15. In this manner, the line interface card 20 couples the ports 25, 27 to the bus 15 to provide a communication link between components coupled to the bus (not illustrated) and the T1 data transmission lines.

The line interface 22 comprises two separate line interface units 29, 31, each coupled to one of the ports 25, 27 respectively. Moreover, each line interface unit 29, 31 is coupled to a transmit processing bus 33, 35 and a receive processing bus 37, 39, respectively. The line interface units 29, 31 support the HDLC data link protocol to receive or transmit serial bit streams and provide the necessary byte framing interface to the processor 22.

The processor 24 comprises four TMS320C25 processors 41, 43, 45, 47. The processors 41, 45 are each dedicated to the processing of data packets to be transmitted out of one of the ports 25, 27, respectively, and are each coupled to a respective transmit processing bus 33, 35. The processors 43, 47 are each dedicated to the processing of data packets received at one of the ports 25, 27, respectively, and are each coupled to a respective receive processing bus 37, 39.

As illustrated in FIG. 1, the buses 33, 37, 35, 39 are all coupled to the interface 26 of the line interface card 20 for acquisition and control of the bus 15 by any one of the processors 41, 43, 45, 47. In this manner, the processors 41, 43, 45, 47 can perform data link and network layer processing for each data packet and individually participate in appropriate bus transactions to transmit data packets to the components coupled to the line interface card 20 via the bus 15.

Figure 2:
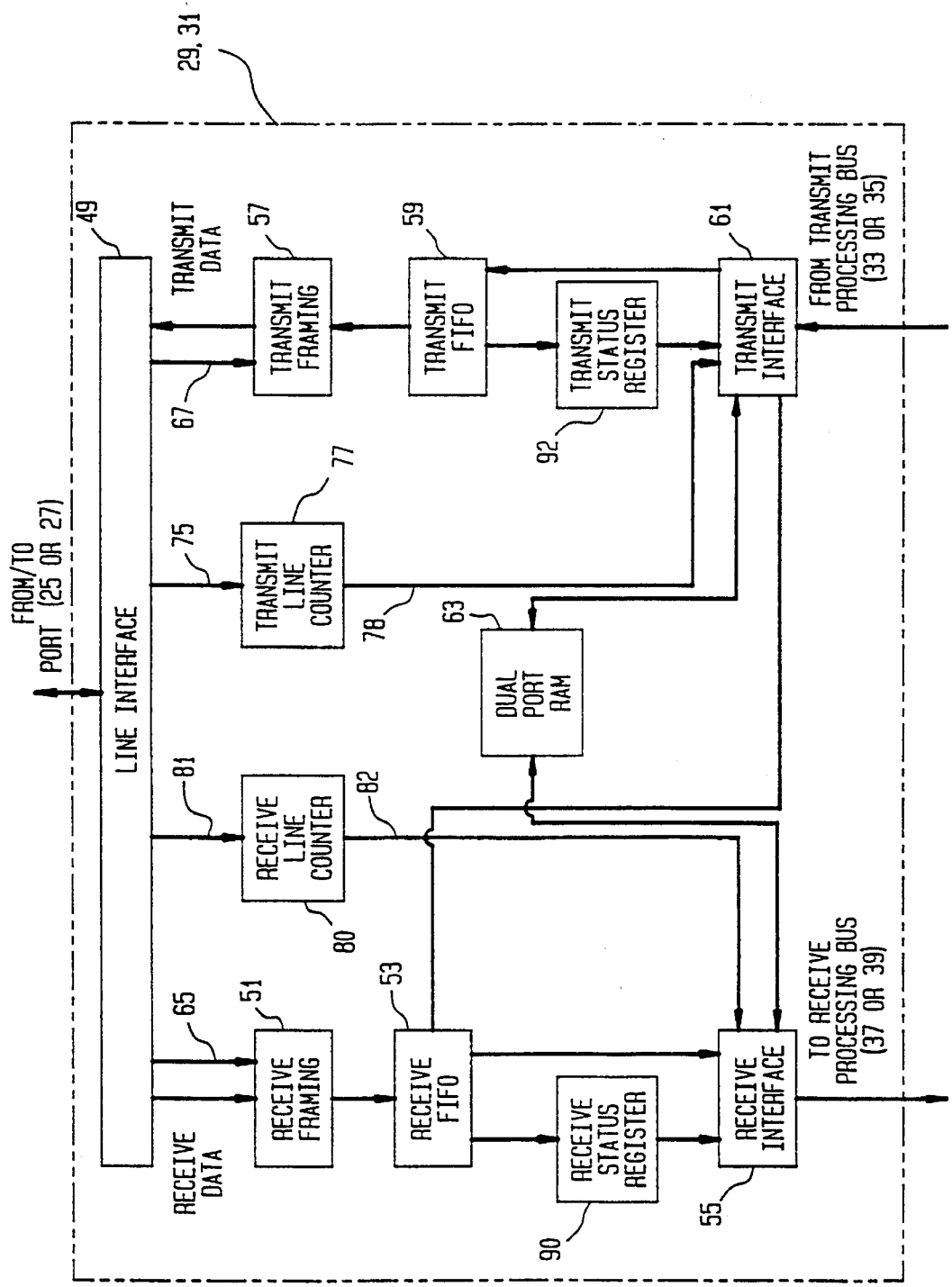
FIG. 2 is a block diagram of the line interface unit of the line interface card of FIG. 1.

Referring now to FIG. 2, there is illustrated in block diagram form a representative embodiment for each of the line interface units 29, 31 according to the present invention. A line interface 49 is coupled to the respective port 25, 27 to serially receive or transmit the bits of data packets and to receive or transmit appropriate control signals required by the physical layer of the transmission service utilized on the transmission line, as e.g., CCITT standard signals.

In accordance with a feature of the present invention, the interface 49 couples all of the serial bits received at the respective port 25, 27 to a receive framing device 51 that operates according to the HDLC data link protocol to frame the received serial bits into bytes of a framed data packet. The framed bytes are stored in a receive FIFO buffer memory 53. The bytes stored in the FIFO buffer 53 are read by a receive processor interface 55 and transmitted to the respective receive processor 43, 47 over the appropriate receive processing bus 37, 39.

As a further feature of the present invention, the interface 49 is coupled to a transmit framing device 57 that generates a serial bit stream for transmission by the interface 49 out of the port 25, 27. The transmit framing device 57 is coupled to a transmit FIFO buffer memory 59 that contains framed bytes of data packets to be transmitted. The transmit framing device 57 also operates according to the HDLC data link protocol to accept the framed data packets stored in the transmit FIFO 59 and produce a corresponding bit stream for transmission by the interface 49. The transmit FIFO 59 is coupled to a transmit interface 61 that is, in turn, coupled to a respective transmit processor 41, 45 by the appropriate transmit processing bus 33, 35. The transmit interface 61 stores framed data packets received from the transmit processor 41, 45 in the transmit FIFO 59 for subsequent transmission.

The separate receive and transmit framing paths provided by the receive framing and transmit framing devices 51, 57 and the use of separate receive and transmit processors 41, 45, 43, 47 permit parallel, concurrent transmit and receive data packet processing in each of the line interface units 29, 31 of the line interface card 20. Thus, the parallel transmit/receive, concurrent processing architecture for the line interfaces takes full advantage of the separate transmit and receive paths utilized in full duplex communication links that are provided by the commercially available leased telephone lines. It should be noted that, as illustrated in FIG. 2, the transmit interface 61 is also coupled to the receive FIFO 53 so that the line interface 29, 31 can operate utilizing only one of the processors, through the transmit interface 61.

Pursuant to another feature of the present invention, a dual port RAM 63 is coupled to each of the receive and transmit interfaces 55, 61 to provide a communication channel between the transmit and receive processors 41, 45, 43, 47. The RAM 63 is divided into three sections. Each of the transmit and receive processors 41, 45, 43, 47 share read and write access to a first section of the RAM 63 so that semaphores can be passed between the processors for communication. The semaphores can include, e.g., a message from the receive processor 43, 47 to the transmit processor 41, 45 requesting the transmit processor 41, 45 to send a message to the component of the network to which the line interface card 20 is linked, to retransmit frames that were not properly received. A protocol can be implemented in each of the processors to control the updating of the semaphore locations of the first section. Alternatively, read and write access to the dual port RAM 63 can be controlled by a hardware mechanism such as the hardware mechanism disclosed in U.S. application Ser. No. 723,054, filed Jun. 28, 1991 entitled APPARATUS FOR SIMULTANEOUS WRITE ACCESS TO A SINGLE BIT MEMORY, filed on even date herewith, now U.S. Pat. No. 5,267,199. application Ser. No. 723,054 filed Jun. 28, 1991 is hereby expressly incorporated by reference.

A second section of the RAM 63 can only be written to by the transmit processor 41, 45 but read by the receive processor 43, 47 and a third section of the RAM 63 can only be written to by the receive processor 43, 47 but read by the transmit processor 41, 45. The second and third sections of the dual port RAM 63 are used to communicate values such as acknowledgement numbers between the transmit and receive processors 41, 45, 43, 47.

For example, as the line interface 49 sends serial bits of a data packet for the transmit processor 41, 45, the other component of the network receiving the packet will return acknowledgement messages pursuant to, e.g., the data link protocol of the transmission line. The acknowledgement messages are received by the receive processor 43, 45 through the receive side of the line interface 29, 31. The receive processor 43, 45 will extract a preselected portion of each acknowledgement message, as, e.g., the frame sequence number contained in the acknowledgement message, and write the preselected portion of each acknowledgement message to its read/write section of the dual port RAM 63. The transmit processor 41, 45 can then read the preselected portions of the acknowledgement messages from that section of the dual port RAM 63.

As another feature of the present invention, a line 65 couples the line interface 49 to the receive framing device 51 so that the line interface 49 can transmit data set signals received by the line interface 49 to the receive framing device 51. The data set signals are transmitted by the component of the network that is transmitting to the line interface card 20 and indicate that a proper communication channel exists between the transmitting component and the line interface 49. The data set signals include the CCITT standard 109 (data channel received line signal detector) and CCITT standard 107 (data set ready) signals. Accordingly, the receive framing device 51 can utilize the data set signals to directly monitor the connection with the transmitting component.

During the framing processing of a bit stream being received through the respective port 25, 27, the receive framing device 51 will only store data byte frames in the receive FIFO 53 when the data set signals are asserted. If the data set signals are negated during the processing of any byte, the receive framing device 51 will stop processing the current frame and place a status indicator in the receive FIFO 53 to indicate to the respective receive processor 43, 47 that a transmission error has occurred. Thus, the receive framing device 51 will not frame and store corrupted data that may appear at the port 25, 27 after the connection with the transmitting component has failed.

Moreover, when the receive processor 43, 47 receives the bytes and status indicator from the receive FIFO 53, it will know that there was a transmission error during the forwarding of the current frame and that the completed frames contained in the receive FIFO 53 were stored while the data set signals were asserted. Accordingly, the receive processor 43, 47 can send a message to the transmit processor 41, 45 via the dual port RAM 63 to request the transmitting component to resend the corresponding frame.

On the transmit side of the line interface 29, 31, a line 67 couples the line interface 49 to the transmit framing device 57 so that the line interface 49 can likewise transmit data set signals received by the line interface 49 to the transmit framing device 57. On the transmit side, the data set signals include CCITT standard 106 (clear to send) or CCITT standard 107 (data set ready) signals. Accordingly, the transmit framing device 57 can also directly monitor the connection with the component of the network meant to receive the data being transmitted by the line interface 49.

If the data set signals are negated during the generation of the bit stream being transmitted by the line interface 49 from the bytes stored by the transmit processor 41, 45 in the transmit FIFO 59, the transmit framing device 57 will terminate processing and transmission after the current byte with an abort sequence. The transmit framing device will also transmit an error status message to the respective transmit processor 41, 45.

The transmit framing device 57 will also flush the transmit FIFO 59 and not permit the storing of any further bytes in the transmit FIFO 59 by the transmit interface 61 until the transmit processor 41, 45 has acknowledged the error status message. Upon receipt of the acknowledgement from the transmit processor 41, 45, the transmit framing device 59 knows that the transmit processor 41, 45 will now be operating in a manner suitable to correct the transmission error, by e.g., transmitting a message to the component of the network meant to receive the data packet, to prompt the component to send a message indicating what data was received by the component. In this manner, the transmit processor 41, 45 will know what data has to be retransmitted. The component will have, of course, received the abort sequence from the transmit framing device 59 and the message for retransmission by the component will be received by the respective receive processor 43, 47. The receive processor 43, 47 will store a preselected portion of the message as a value in the dual port RAM 63, and that value is read by the transmit processor 41, 45.

Since the transmit framing device 59 maintains the transmit FIFO 59 flushed until it knows that the transmit processor 41, 45 has become aware of the transmission error, there will not be any out of sequence frames in the transmit FIFO 59 that were sent to the transmit FIFO 59 after negation of the data set signals but before the transmit processor 41, 45 received the error message. In this manner, the transmit framing device 59 avoids wasting bandwidth on the line by only transmitting frames stored in the transmit FIFO 59 after the acknowledgement of the error condition and a reassertion of data set signals.

The direct monitoring of the data set signals by the receive and transmit framing devices 51, 57 provides a straightforward scheme for the efficient detection and correction of transmission errors. The framing devices interlock detection of data set signals with data being received or transmitted so that the FIFO's 53, 59 can be rapidly loaded with data with error detection being directly associated with a specific frame. The processing of frames is terminated by the respective framing device 51, 57 upon the detection of a negation of the data set signals and appropriate status messages are generated at that time by the framing device 51, 57 for initiation of retransmission of specific frames identified at the occurrence of a transmission error without any waste of bandwidth.

Pursuant to another feature of the present invention, the receive and transmit framing devices 51, 57 do not necessarily terminate processing immediately upon the detection of the negation of the data set signals. Rather, the framing device 51, 57 can be controlled to wait a predetermined fixed period of time after negation of the data set signals and will proceed to terminate processing only if the data set signals remain negated at the end of the fixed period of time. This will "smooth" out the operation of the framing device 51, 57 to prevent the termination of processing when the negation of the data set signals is merely a glitch or is proper, as, e.g., at the end of a transmission, but is detected by the framing device 51, 57 while data is still arriving.

It has been found that modems tend to move signals relative to one another. A modem may drop the data set signals when it transmits the last "flag" byte of a frame. A slight shift in the time relationship between the dropping of the data set signals and the transmission of the last byte may result in the framing device 51, 57 detecting the negation of the data set signals prior to reception of the last byte causing the framing device 51, 57 to treat the negation of the data set signals as a transmission error. The wait time period prevents this from happening. The framing devices 51, 57 will, however, immediately commence processing upon detection of the assertion of the data set signals. During the operation of the transmit framer 57, bytes are continuously transmitted to the port 25, 27 so long as there are bytes in the transmit FIFO 59. If the transmit FIFO 59 becomes empty, the transmit framer 57 will commence an abort sequence. As described above, the port 25, 27 is coupled to a high speed transmission line that may be able to transmit data as fast as the transmit processor 41, 45 can send data to the transmit FIFO 59. The time required to process the first several bytes of a data packet by the processor 41, 45 can be longer than the transmit time for those bytes. Thus, at times, the transmit framer 57 may be able to empty the transmit FIFO 59 faster than the transmit processor 41, 45 can store bytes into the transmit FIFO 59.

In accordance with another feature of the present invention, a programmable threshold is set by the transmit processor 41, 45 and communicated to the respective transmit FIFO 59. The transmit FIFO 59 will not start the transmission of bytes to the transmit framing device 57 until the number of bytes in the transmit FIFO 59 is at least equal to the threshold value. The threshold is set by the transmit processor 41, 45 to a value equal to the number of bytes for which its processing time is greater than the transmit time. After that number of bytes, the transmit processor 41, 45 will be able to send bytes to the transmit FIFO 59 as fast as they can be transmitted over the line. The transmit FIFO 59 will therefore buffer at least the threshold number of bytes to provide the transmit processor with sufficient time to reach the transmission speed of the line. The transmit framing device 57 will thus always have bytes available for transmission in the transmit FIFO 59.

There are a number of exceptions to the threshold rule. For example, there is an override to the threshold when the total size of a framed data packet is less than the threshold value. In that instance, the transmit FIFO 59 will then override the threshold and release the bytes to the transmit framing device 57. The transmit processor 41, 45 sends a command byte to the transmit FIFO 59 for each framed data packet. The command byte is stored in the transmit FIFO 59 when all of the data bytes of the corresponding frame are stored in the transmit FIFO 59. An override indication for the transmit FIFO 59 can comprise the command byte associated with a frame that is smaller in size than the threshold value. When the transmit FIFO 59 sees a command byte it will send the frame to the transmit framing device 57 regardless of the threshold value.

In addition, the transmit FIFO 59 counts the number of command bytes in the transmit FIFO 59. The count is incremented whenever a new command byte is stored in the transmit FIFO 59 and is decremented whenever a complete frame is transmitted out of the transmit FIFO 59. As long as there are multiple commands in the transmit FIFO 59, the FIFO 59 will override the threshold since the presence of multiple commands indicates that several complete data packets are stored in the transmit FIFO 59 and available for transmission. When the number of command bytes is zero and the total number of bytes in the transmit FIFO 59 is less than the threshold, there is again a situation where the transmit framing device 57 can empty the FIFO 59 faster than it can be refilled by the transmit processor 41, 45. These bytes will be held in the FIFO 59 until the threshold value is exceeded.

Another feature of the present invention relates to cyclical redundancy checking (CRC) of data transmissions. Data packets transmitted through the network can have either 16 bit or 32 bit CRC codes appended to them. The type of CRC code being utilized by a component sending data to the line interface card 20 is communicated to each of the receive processor 43, 47 and the receive framing device 51.

As serial bits of a data transmission are received in the receive framing device 51, the framing device 51 will accumulate both 16 bit and 32 bit CRC blocks. The receive framing device 51 will check both the CRC code that is expected, i.e. one of the 16 bit or 32 bit blocks and the other CRC code. The checking of each CRC code can be performed in parallel. If the expected CRC code is not correct, and the other CRC code is correct, the receive framing device 51 will send a message to the receive processor 43, 47 indicating that the expected CRC code is incorrect but that the other CRC code is correct. The receive processor 43, 47 can then take appropriate action to reconfigure the link if necessary to change the expected CRC code.

On the transmit side, the transmit processor 41, 45 can dynamically indicate to the transmit framing device 57 whether or not to generate and add a CRC code to a packet being transmitted. When the line interface card 20 is operating within a bridge between LAN's, the CRC of a data packet passed through the bridge is not meant to be altered inasmuch as in a bridge, the ultimate destination of the packet performs CRC checking of the original CRC code. Thus, when the line interface card 20 is operating as a bridge, the transmit processor 41, 45 will indicate to the transmit framing device 57 in the command byte that the CRC code should not be appended.

Pursuant to another feature of the present invention, the CCITT standard transmit line clock signal 114 is transmitted from the line interface 49 over a line 75 to a transmit line counter 77. The transmit line counter 77 will use the CCITT signal 114 to determine the line speed being utilized on the link coupled to the respective port 25, 27 and transmit line speed information to the transmit interface 61 via a line 78. In this manner, the line speed information is made available to the transit processor 45, 47. This will enable the transmit processor 45, 47 to directly utilize line speed information to configure itself for the scheduling of events and the performance of operations required in the processing of data according to the actual line speed of the link. In addition, the transmit processor 45, 47 can use the transmission of the line speed information as an indication that a link exists with another component of the computer network.

In a similar manner, the receive processor 41, 43 is provided with line speed information contained in the CCITT 115 receive line clock signal via the receive line counter 80 and the lines 81, 82.

Referring once again to FIG. 2, a receive status register 90 is coupled between the receive FIFO buffer 53 and the receive interface 55 and a transmit status register 92 is coupled between the transmit FIFO buffer 59 and the transmit interface 61. The status registers are each loaded by the respective FIFO buffer 53, 59 to indicate the operating state of the FIFO, e.g. normal or error condition. Each of the receive and transmit processors 41, 43 and 45, 47, respectively, can periodically poll the respective status register 90, 92 to determine the state of the corresponding FIFO buffer.

According to a feature of the present invention, a zero value stored in the respective status register 90, 92 indicates a normal operating state for the respective FIFO buffer 53, 59 with either space available for storage of additional bytes, in the case of the transmit FIFO buffer 59, or bytes stored in the FIFO for reading, in the case of the receive FIFO buffer 53. Thus, each of the processors 41, 43, 45 and 47 need only perform a simple test for a zero value in the respective status register 90, 92 during each polling operation to determine that the state of the corresponding FIFO is normal and reading or writing of bytes should proceed. It is only during an error condition, buffer full state (on the data transmit side) or buffer empty state (on the data receive side) that any of the processors 41, 43, 45 and 47 need to read and process the bits of the respective status register 90, 92. Thus, the time required to poll the status registers is minimized by the simple test for zero value process for a determination of normal operation.

What is claimed is:

1. A data link interface adapted to be coupled to a full duplex synchronous data transmission line, which comprises:

a receive data line interface device adapted to be coupled to the receive data path of the synchronous data transmission line, said receive data line interface device providing a receive data framing path for data received from the receive data path of said synchronous data transmission line and a separate transmit data line interface device adapted to be coupled to the transmit data path of the synchronous data transmission line, said transmit data line interface providing a transmit data framing path for data transmitted to the transmit data path of said synchronous data transmission line;

wherein the receive data line interface device receives serial data via the receive data path of the synchronous data transmission line and the transmit data line interface device transmits serial data to the transmit data path of the synchronous data transmission line.

2. The data link interface of claim 1 further comprising a receive data processor coupled to said receive data line interface device to perform data link layer processing of the serial data received via the receive data path of the synchronous data transmission line and a separate transmit data processor coupled to said transmit data line interface device to perform data link layer processing to produce serial data to transmit to the transmit data path of the synchronous data transmission line.

3. The data link interface of claim 2, wherein said receive data line interface device receives via the receive data path of the synchronous data transmission line and processes each of a first expected CRC code and a second CRC code for receive data, and generates and transmits a message to the receive data processor when the first expected CRC code is incorrect and the second CRC code is correct.

4. The data link interface of claim 2, wherein said transmit data line interface device is dynamically controlled by the transmit data processor to attach CRC code information to transmit data.

5. The data link interface of claim 2, wherein the data link interface couples line clock signal information from the data transmission line to each of the receive data processor and the transmit data processor via respective line counters, said line counters converting said line clock signal information into line speed information of said data transmission line.

6. The data link interface of claim 2 wherein the receive data processor further performs network layer processing of the serial data received via the receive data path of the synchronous data transmission line and wherein the transmit data processor further performs network layer processing in producing the serial data to transmit to the transmit path of the synchronous data transmission line.

7. The data link interface of claim 1 further comprising a dual port RAM coupled to each of said receive data line interface device and said transmit data line interface device for passing messages therebetween.

8. The data link interface of claim 1 wherein said receive data line interface device comprises a receive data framing device to frame serial data received from the receive data path of the synchronous data transmission line into receive frames, a receive data FIFO buffer coupled to said receive data framing device to store the receive frames and a receive data interface device coupled to said receive data FIFO buffer and adapted to be coupled to a receive data processor for the transmission of the receive frames to the receive data processor.

9. The data link interface of claim 8, wherein said transmit data line interface device comprises a transmit data framing device to transmit frames as serial data to the transmit data path of the synchronous data transmission line, a transmit data FIFO buffer coupled to said transmit data framing device to store transmit frames and a transmit data interface device coupled to said transmit data FIFO buffer and adapted to be coupled to a transmit data processor to receive transmit frames from the transmit data processor for storage in said transmit data FIFO buffer.

10. The data link interface of claim 9, wherein said transmit data framing device transmits data from said transmit data FIFO buffer when a number of bytes of data stored in said transmit data FIFO buffer exceeds a threshold value.

11. The data link interface of claim 10, wherein said transmit data framing device transmits data from said transmit data FIFO buffer when the number of bytes of data stored in said transmit data FIFO buffer is less than the threshold value and the bytes stored in the transmit data FIFO buffer comprise at least one complete frame for transmission.

12. The data link interface of claim 8, further comprising a receive status register coupled between the receive data FIFO buffer and the receive data interface device, the receive status register being controlled to store a zero value to indicate normal operation for the receive data FIFO buffer with data stored in the receive data FIFO buffer.

13. The data link interface of claim 9, further comprising a transmit status register coupled between the transmit data FIFO buffer and the transmit data interface device, the transmit status register being controlled to store a zero value to indicate normal operation for the transmit data FIFO buffer with space available in the transmit data FIFO buffer.

14. A data link interface adapted to be coupled to a full duplex synchronous data transmission line, the data link interface comprising:

a first port coupling the data link interface to the receive data path of the synchronous data transmission line;

a second port, separate from said first port, coupling the data link interface to the transmit data path of the synchronous data transmission line;

a receive data line interface device coupled to the first port and receiving serial data via the receive data path of the synchronous data transmission line, said receive data line interface device providing a receive data framing path for data received from the receive data path of said synchronous data transmission line; and a separate transmit data line interface device coupled to the second port and transmitting serial data to the transmit data path of the synchronous data transmission line, said transmit data line providing a transmit data framing path for data transmitted to the transmit data path of said synchronous data transmission line.

15. A data link interface adapted to be coupled to a full duplex synchronous data transmission line, the data link interface comprising:

a first port coupling the data link interface to the synchronous data transmission line;

a second port, separate from said first port, coupling the data link interface to the synchronous data transmission line; and a line interface coupled to the first port and the second port, the line interface including:

a first line interface unit, coupled to the first port, the first line interface unit in a first mode receiving serial data via the receive data path of the synchronous data transmission line and in a second mode transmitting serial data to the transmit data path of the synchronous data transmission line, and a second line interface unit, separate from said first line interface unit, coupled to the second port, the second line interface unit in the second mode receiving serial data via the receive data path of the synchronous data transmission line and in the first mode transmitting serial data to the transmit data path of the synchronous data transmission line.

16. The data link interface of claim 15 wherein the first line interface unit is coupled to a transmit processing bus and a receive processing bus and wherein the second line interface unit is coupled to the transmit processing bus and the receive processing bus.

* * * * *